US00RE43908E

(19) United States
(12) Reissued Patent
Demko

(10) Patent Number: US RE43,908 E
(45) Date of Reissued Patent: Jan. 8, 2013

(54) DUAL HANDLE SAFETY FOLDING KNIFE

(75) Inventor: Andrew Demko, Wampum, PA (US)

(73) Assignee: Cold Steel, Ventura, CA (US)

(21) Appl. No.: 12/806,515

(22) Filed: Nov. 1, 2010

Related U.S. Patent Documents

Reissue of:

(64) Patent No.: 7,676,930
Issued: Mar. 16, 2010
Appl. No.: 11/811,661
Filed: Jun. 12, 2007

(51) Int. Cl.

| | |
|---|---|
| ***B26B 3/06*** | (2006.01) |
| ***B26B 11/00*** | (2006.01) |
| ***F41B 13/02*** | (2006.01) |
| ***F41C 27/18*** | (2006.01) |

(52) U.S. Cl. ..... 30/153; 30/154; 30/340; 30/157; 30/180; 30/160; 7/118

(58) Field of Classification Search ..... 30/153–155, 30/159–161, 340, 342, 157; 8/118
See application file for complete search history.

(56) References Cited

U.S. PATENT DOCUMENTS

| | | | | | |
|---|---|---|---|---|---|
| 229,706 | A | * | 7/1880 | Jansen | 30/153 |
| 1,665,955 | A | * | 4/1928 | Gateweood | 30/153 |
| 2,263,415 | A | * | 11/1941 | Schaaff et al. | 30/160 |
| 2,671,668 | A | * | 3/1954 | Krause et al. | 279/97 |
| 2,695,450 | A | * | 11/1954 | Platts | 30/342 |
| 2,714,249 | A | * | 8/1955 | Clark et al. | 30/153 |
| 4,047,298 | A | | 9/1977 | Philippar | |
| 4,271,592 | A | * | 6/1981 | Hoptner | 30/153 |
| 4,330,937 | A | * | 5/1982 | Cope | 30/153 |
| 4,364,174 | A | * | 12/1982 | De Asis | 30/153 |
| 4,547,965 | A | * | 10/1985 | Moore | 30/153 |
| 4,648,145 | A | * | 3/1987 | Miceli | 7/158 |
| 4,672,743 | A | * | 6/1987 | Grahm | 30/153 |
| 4,722,140 | A | * | 2/1988 | Miceli | 30/153 |
| 6,195,898 | B1 | | 3/2001 | Lemisch | |
| 6,848,183 | B2 | | 2/2005 | Lemisch | |

* cited by examiner

*Primary Examiner* — Ghassem Alie
*Assistant Examiner* — Bharat C Patel
(74) *Attorney, Agent, or Firm* — Harpman & Harpman

(57) ABSTRACT

An improvement for a dual handle fighting knife having interlocking handles when in open position and multiple spring blades stabilization in open and closed position. The handle blade spring engagement provides for a safe, straight-forward interlocking blade position and spacing of said cutting edge engagement with said handle when in closed position.

2 Claims, 4 Drawing Sheets

[As Amended]

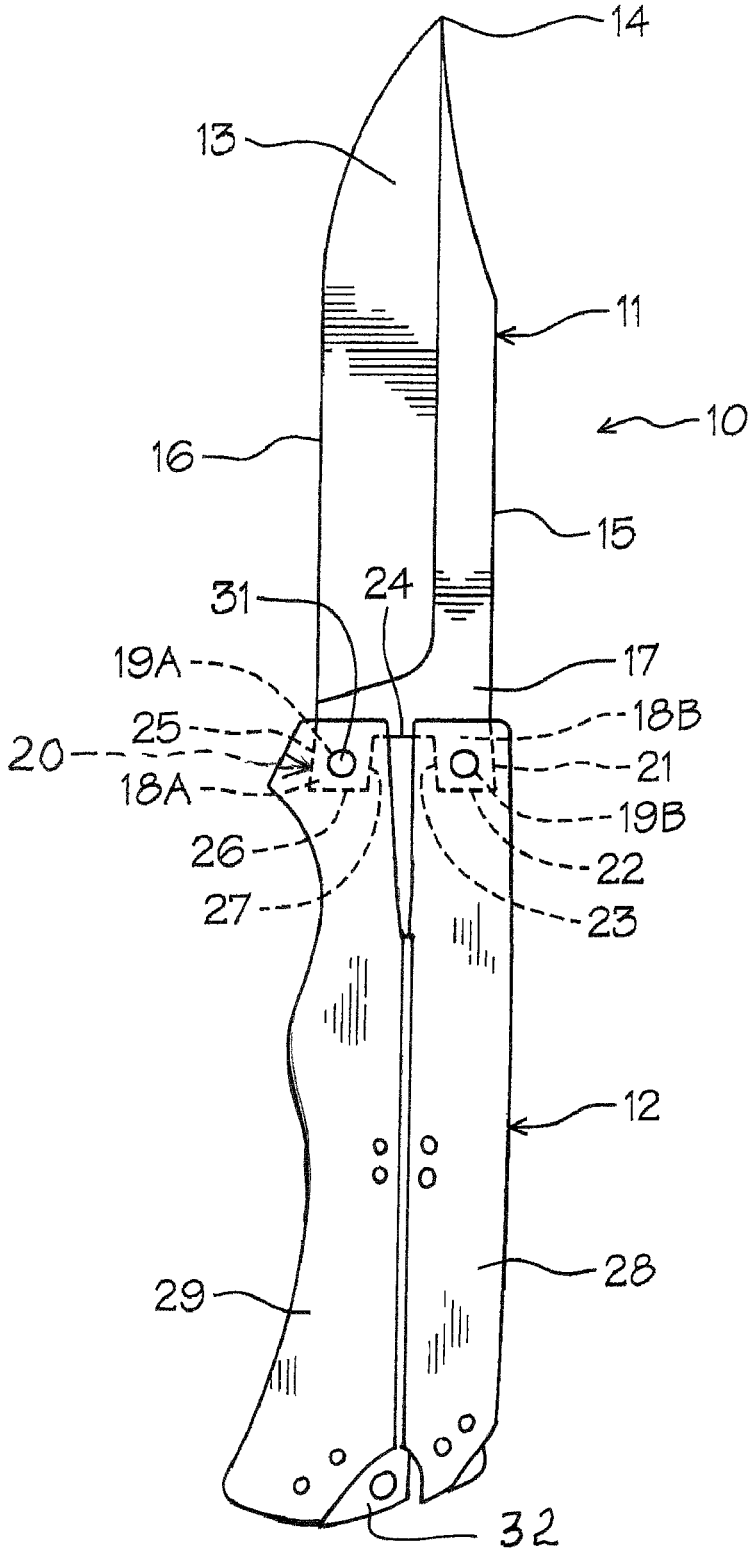
FIG. 1 [As Amended]

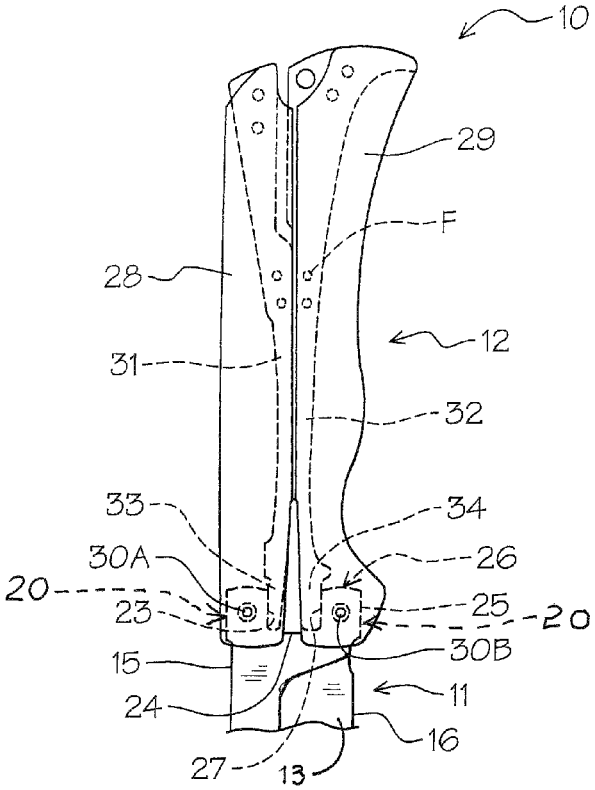
FIG. 2 [As Amended]
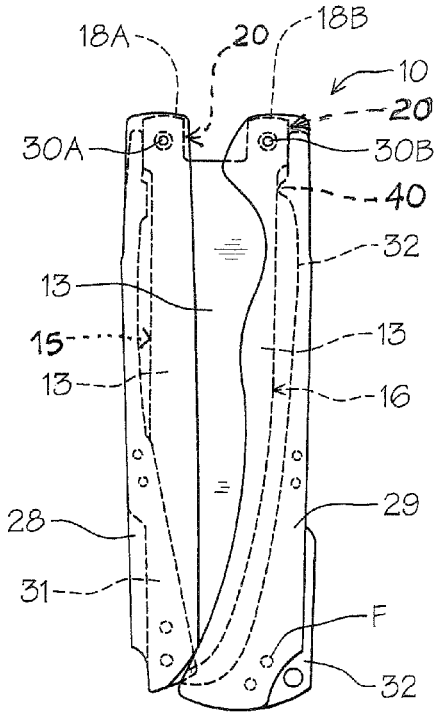
FIG. 3
[As Amended]

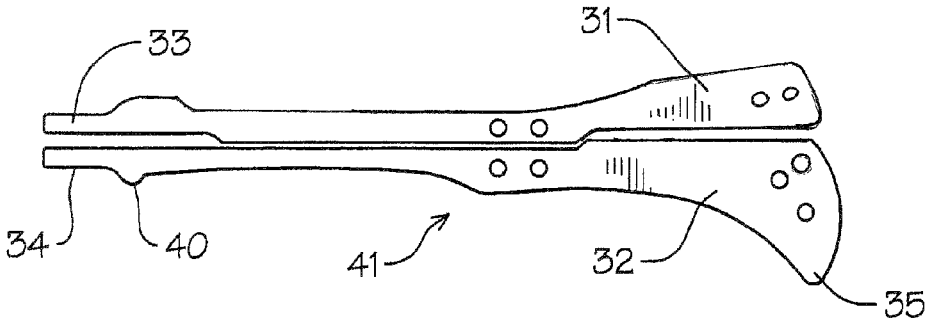
FIG. 6 [As Amended]
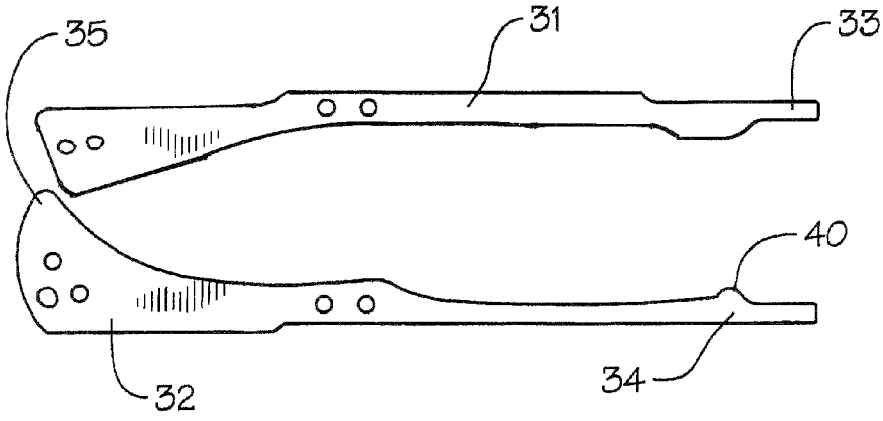
FIG. 7 [As Amended]

DUAL HANDLE SAFETY FOLDING KNIFE

Matter enclosed in heavy brackets [ ] appears in the original patent but forms no part of this reissue specification; matter printed in italics indicates the additions made by reissue.

BACKGROUND OF THE INVENTION

1. Technical Field

This invention relates to knives, specifically folding knives that have a blade attached to a pivoting handle. Such knives typically lock in open use or closed position with the blade stored within or partially within the handle.

2. Description of Prior Art

A dual handle knife or "butterfly, fighting" knife typically has a pair of pivoting handles, each of which covers one-half the blade in folded closed position and forms a full hand grip in open use position.

A number of prior dual handle "butterfly" type knives have been developed with modified blade and handle locking mechanisms. Such locking systems have relied on a variety of additional engagement structures as seen generally in U.S. Pat. Nos. 4,047,298, 4,364,174, 4,547,965, 6,195,898 and 6,848,183.

In U.S. Pat. No. 4,047,298 a sheath and rigid handle for a knife is disclosed in which a two-piece full handle pivots at right angles to the blade.

U.S. Pat. No. 4,364,174 claims an improved manufacturing method for a handle of a butterfly fighting knife.

A synchronized folding knife is seen in U.S. Pat. No. 4,547,965 having a pair of channel handles that are pivotally connected to a knife blade with mesh gears.

U.S. Pat. No. 6,195,898 is directed to a magnetically locking butterfly fighting knife having a pair of magnets on the respective end handle portions so as to be magnetically attracted to one another in either open or in closed position due to the corresponding positioning of the plurality of the magnets.

Finally, in U.S. Pat. No. 6,848,183 a thumb lock for a butterfly fighting knife is disclosed wherein a locking mechanism is positioned on the distal end of the knife handles and has a movable magnetic components and interengaging swing elements associated therewith.

SUMMARY OF THE INVENTION

A locking dual handle "butterfly type fighting knife" having a pair of integral blade engaging elongated spring urged handle elements that selectively engage a compound configured surface of pivoted handle engagement points. Such multiple selective sequential registration provides for positive multiple handle positions that are sequentially engaged from a locked closed position to intermediate and then to an open use locked positions. Handle interengagement portions prevent translateral movement of the handle elements with one another when in open use position.

DESCRIPTION OF THE DRAWINGS

FIG. 1 is a side elevational view of the knife of the invention in open use position.

FIG. 2 is a partial enlarged side elevational view of the improved handle and blade configurations of the invention in open use locked position.

FIG. 3 is a side elevational view of the knife as seen in closed locked position.

FIG. 6 is a side elevational view of the blade handle spring elements in open independent position.

FIG. 7 is a side elevational view of the blade handle spring elements in closed independent position orientation.

DETAILED DESCRIPTION OF THE INVENTION

Figure 4:
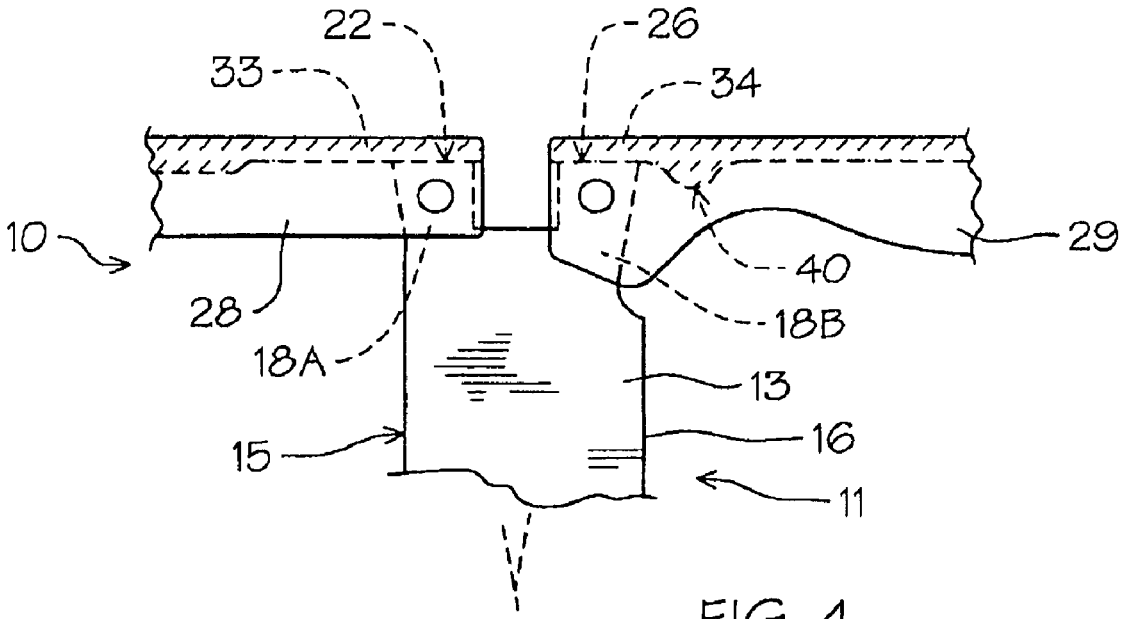
FIG. 4 is an enlarged side elevational view with portions broken away illustrating intermediate handle positions.
Figure 5:
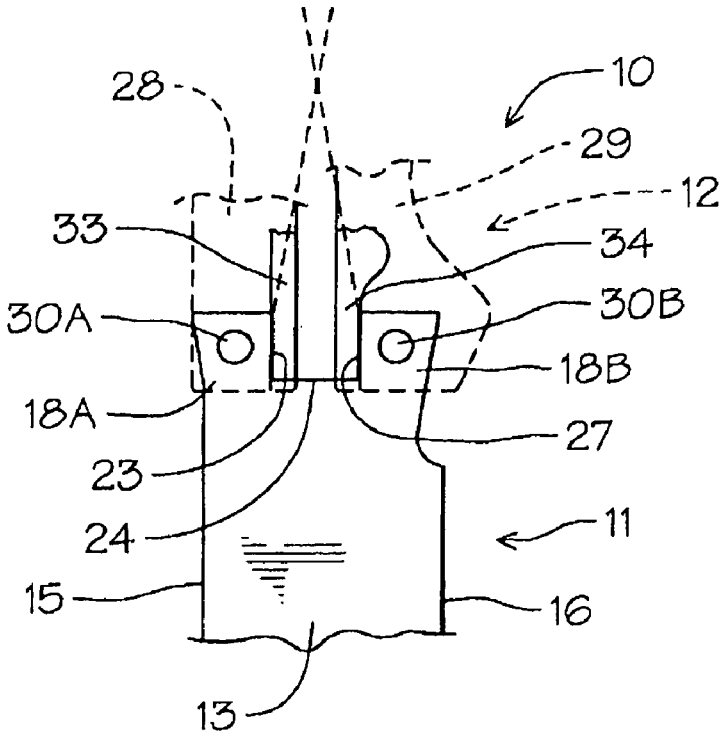
FIG. 5 is an enlarged side elevational view with portions broken away in open use position illustrating blade shank pivot surface engagement with respective handle portions.

Referring to FIGS. 1-4 of the drawings, a folding knife 10 of the invention can be seen having a blade portion 11 and a handle portion 12. The blade portion 11 has a blade element 13 with an end point 14, back edge 15 and oppositely disposed cutting edge 16. A shank 17 of the blade has bifurcated handle engagement shank portions 18A and 18B with respective pivot apertures 19A and 19B therewithin, Each of the shank portions 18A and 18B have different angled engagement surfaces 20 with the shank portion 18B having a tapered outside edge 21 with a right angular end edge 22. An angularly disposed return edge 23 terminates at a joining end edge 24 extending between the respective bifurcated end portions. The shank portion 18A has an outside tapered edge 25 with a right angled end edge 26. A corresponding return edge 27 has an angularly disposed surface effacing the hereinbefore described return edge 23 and terminates in the corresponding adjoining end edge 24, as noted.

It is important to note that the return angled edge surfaces of the shank portions 18A and 18B are at a precise angular inward inclination away from one another indicated for engagement with the handle portion 12 as will be described in greater detail hereinafter.

The handle portion 12 is comprised of a pair of independent handle elements 28 and 29, best seen in FIGS. 1, 2 and 3 of the drawings which are pivotally secured to the respective shank portions 18A and 18B by pivot pins 30A and 30B respectively.

Each of the handle elements 28 and 29 have elongated compound shaped spring plates 31 and 32 respectively, best seen in dotted lines and independently in solid lines in FIGS. 6 and 7 of the drawings. The spring plates 31 and 32 have engagement end portions 33 and 34 and are secured to the respective handle elements 28 and 29 by multiple fasteners F positioned along their longitudinal length.

In operation, as shown in open "used" blade extended and locked position as seen in FIGS. 1, 2, 5 and 6 of the drawings, the spring plate end engagement portions 33 and 34 are registerable on the respective effacing shank portion's angled surfaces 23 and 27 and the handle element pairs 28 and 29 are engaged with one another for use. A spring plate portion 35 interlocks the free ends of the handle portions 28 and 29 as best seen in FIG. 2 of the drawings preventing handle translateral movement therebetween.

The respective engagement surfaces of the end engagement portions 33 and 34 impart a co-lateral force on the incline return surfaces 23 and 27 of the shank portions 18A and 18B due to their angular inclination thus maintaining a secure lock position in the open configuration.

Referring to FIG. 4 of the drawings, it will be seen that the handle portions 28 and 29 have been closed midway in which the spring plate end engagement portions 33 and 34 fully engage the respective shank portion end surfaces 22 and 26 imparting a positive positioning thereto at right angles to the blade.

Upon closure, as seen in FIG. 3 of the drawings, the handle portions 28 and 29 are respectively engaged over the back of the blade edge 15 and cutting edge 16 of the blade 13. In this position the spring end plate portions 33 and 34 are now in contact with the corresponding outer surfaces 21 and 25 of the shank portions 18A and 18B which due to their angular inclination as previously described will force the handles 28 and 29 together, holding the handles tightly closed on the blade 13 as described. The spring plate 32 has an extending blade stop 40 inwardly of its end engagement portion 34 that prevents the blade 13 upon full closure of the handle 29 thereon from engagement with the cutting edge 16 by spaced contact therewith indicated generally at 41.

Correspondingly, the handle portion 28 is held tightly against the back edge 15 of the blade 13 with the spring plate 31 resting along the back edge 15 of the blade as best seen in FIG. 3 of the drawings in dotted lines.

If will be evident from the above description that the improved dual handle fighting knife 10 of the invention provides for a unique multiple handle retainment positionings wherein the spring plates 31 and 32 engagement configuration with the angular orientation of the shank portions 18A and 18B corresponding registration surface pairs 23 and 27 when in open position and 21 and 25 when in closed position and 22 and 23 when in transition position. The handle pairs 28 and 29 and blade 13 will always be in retained resistant relation to one another that is novel only to a dual handle folding knife 10 of the invention with the above described critical improvements and structural configurations as defined.

Therefore I claim:

1. A dual handle folding knife comprising, an elongated blade having [a] bifurcated shank [portion with multiple spring engagement surfaces thereon] *portions spaced by an adjoining end edge extending between the shank portions, each shank portion having multiple spring engagement edge surfaces including an outside edge and an inside edge*, a pair of elongated handle portions, *each handle portion being* pivotally secured to [said respective blade] *one of the* shank portions by [pivots] *a pivot*,

[said] *and each* handle [portions] *portion* having [an] *a corresponding* elongated spring plate [respectively] secured thereto, *each inside edge engagement surface of said shank portions is at a different angle with respect to said adjoining end edge,*

[the multiple engagement surfaces of said shank portion are tapered in respect to one another,]

each spring plate having [contoured] *an* end portion [registerable on said respective opposing tapered spring engagement surfaces and said end portions registerable on said respective opposing tapered spring] *for engagement with the spring engagement edge surfaces of one of the bifurcated shank portions, with each end portion being substantially registerable against one of the inside edge* engagement surfaces *which* are in equilateral alignment with said respective pivots [while] *when* the blade is in *an* open locked position and [handle] *engaged against the respective outside edge when the blade is* in [closed] *close* locked position, a blade stop extension, [wherein] spaced inwardly from [said shank] *the end* portion on one of said spring plates, for spacing a cutting surface of said blade from said [registering handle portion] *respective spring plate when the blade is* in close locked position *and*, one of said spring plates [inter-engaging] *attached to the corresponding one of said handle* [portion] *portions being interengaging with the other handle portion to prevent lateral movement* between said handle portions when [in] *the* blade *is in* open locked position.

2. The dual handle *folding* knife set forth in claim 1 wherein said spring plate for interengaging between said handle portions *to prevent lateral movement* when [in in] *the* blade *is in* open locked position, *further* comprises,

[the contoured] *a second* end portion of one of said spring plates [in], *which is* oppositely disposed *in* relation to said *bifurcated* shank [engagement end portion is] *portions* registerable within said [adjacent] *corresponding* handle portion *to prevent lateral movement*.

* * * * *